(12) United States Patent
Kamiya et al.

(10) Patent No.: US 6,918,262 B2
(45) Date of Patent: Jul. 19, 2005

(54) AIR CONDITIONING SYSTEM

(75) Inventors: Tomohiro Kamiya, Takahama (JP);
Koichi Ito, Handa (JP); Kazushi Shikata, Kariya (JP); Masafumi Kawashima, Kariya (JP); Yasuyuki Nishi, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/637,262

(22) Filed: Aug. 8, 2003

(65) Prior Publication Data

US 2004/0031279 A1 Feb. 19, 2004

(30) Foreign Application Priority Data

Aug. 9, 2002 (JP) .......................... 2002-232919
Oct. 30, 2002 (JP) .......................... 2002-315798

(51) Int. Cl.[7] .............................................. B60H 1/32
(52) U.S. Cl. ........................... 62/244; 62/316; 454/136; 454/186
(58) Field of Search ....................... 62/244, 239, 259.1, 62/316, 256; 454/136, 137; 545/139, 186

(56) References Cited

U.S. PATENT DOCUMENTS

| | | | | |
|---|---|---|---|---|
| 5,524,923 A | * | 6/1996 | Henseler .................. 280/728.3 |
| 5,620,366 A | * | 4/1997 | Munzel et al. .............. 454/152 |
| 6,071,591 A | * | 6/2000 | Dausch ....................... 428/132 |
| 6,286,328 B1 | * | 9/2001 | Kawahara ..................... 62/285 |
| 6,390,913 B1 | * | 5/2002 | Wieschermann et al. ... 454/108 |
| 6,491,578 B2 | * | 12/2002 | Yoshinori et al. ............ 454/139 |
| 6,530,832 B2 | * | 3/2003 | Elliot et al. .................. 454/127 |
| 6,656,035 B2 | * | 12/2003 | Duriez et al. ................ 454/152 |
| 6,668,909 B2 | * | 12/2003 | Vincent ........................ 165/42 |
| 6,709,327 B2 | * | 3/2004 | Elliot et al. .................. 454/121 |
| 6,749,656 B2 | * | 6/2004 | Paumier et al. ............. 55/385.3 |
| 2001/0021634 A1 | * | 9/2001 | Elliot et al. .................. 454/121 |
| 2001/0039178 A1 | * | 11/2001 | Elliot .......................... 454/121 |

FOREIGN PATENT DOCUMENTS

| | | |
|---|---|---|
| JP | 02000289430 A | * 10/2000 |
| JP | 2001-89959 | 4/2001 |
| JP | 02001270324 A | * 10/2001 |
| WO | WO 01/66371 A2 | * 9/2001 |

* cited by examiner

Primary Examiner—Harry B. Tanner
Assistant Examiner—Mohammad M. Ali
(74) Attorney, Agent, or Firm—Harness, Dickey & Pierce, PLC

(57) ABSTRACT

An air conditioning system includes an air conditioner for blowing conditioned air toward a compartment of a vehicle, and a dashboard having a design surface exposed to the compartment. An inner air passage extending nearly parallel to the design surface is formed in the dashboard, and a plurality of diffusion blowing openings are formed in the design surface. Thus, the condensed air is blown from the diffusion blowing openings into the compartment of the vehicle, while passing through the inner air passage. For example, cool air is blown from the diffusion blowing openings, so that the cool air can cool the dashboard while cooling the compartment of the vehicle. Moreover, because the cool air passes through the inner air passage extending nearly parallel to the design surface, the dashboard can be effectively cooled.

31 Claims, 15 Drawing Sheets

AIR CONDITIONING SYSTEM

CROSS REFERENCE TO RELATED APPLICATION

This application is based on Japanese Patent Applications No. 2002-232919 filed on Aug. 9, 2002, and No. 2002-315798 filed on Oct. 30, 2002, the disclosure of which is incorporated herein by reference.

BACKGROUND OF THE INVENTION

1. Field of the Invention

The present invention relates to an air conditioning system for performing air-conditioning of a room of a building, a passenger compartment of a vehicle and the like.

2. Description of the Related Art

An air conditioning system in a related art, conditioned air is generally blown from an air outlet opening of an air conditioner to cool or heat a room. When the room is cooled in a case where a wall member of a dashboard of a vehicle or a wall member of a building is brought to high temperature by solar radiation and outside air of high temperature, radiant heat from the wall member to the air in the room restricts the room from being immediately cooled. Moreover, when the room is heated in a case where the wall member is brought to low temperature by outside air of low temperature, heat absorption of the wall member from the air in the room restricts the room from being immediately heated.

SUMMARY OF THE INVENTION

In view of the above-described problems, it is an object of the present invention to provide an air conditioning system capable of immediately air-conditioning a room.

According to the present invention, an air conditioning system includes an air conditioner for blowing conditioned air into a room, and a wall member (i.e., wall-like member) having a design wall surface exposed inside the room. Further, the wall member has therein an inner air passage through which the conditioned air from the air conditioner flows, and the inner air passage extends approximately parallel to the design wall surface. In the air conditioning system, the design wall surface has a plurality of diffusion blowing openings communicating with the inner air passage, and the inner air passage and the diffusion blowing openings are provided such that the conditioned air is blown from the diffusion blowing openings into the room while passing through the inner air passage. For example, when the conditioned air is cool air for cooling the room, cool air is blown from the diffusion blowing openings into the room while passing through the inner air passage of the wall member. Therefore, the wall member can be cooled while the room is cooled. Further, because cool air passes through the inner air passage approximately parallel to the design wall surface, the wall member can be effectively cooled by the cool air. Thus, it can restrict radiation heat from the wall member, and the room can be immediately cooled. Similarly, when the conditioned air is warm air for heating the room, warm air is blown from the diffusion blowing openings into the room while passing through the inner air passage of the wall member. Therefore, the wall member can be heated while the room is heated. Further, warm air passes through the inner air passage approximately parallel to the design wall surface, the wall member can be effectively heated by the warm air. Thus, it can restrict heat absorption from the wall member, and the room can be immediately heated.

Preferably, the wall member has a design sheet defining the design wall surface, a base plate that is arranged on a side opposite to the room with respect to the design sheet to form the inner air passage between the base plate and the design sheet, and an elastic member that is sandwiched between the design sheet and the base plate and is elastically deformed. For example, the elastic member has a resin thread extending in a direction of thickness of the elastic member. Alternatively, the elastic member has a resin thread extending in a direction crossing a direction of thickness of the elastic member. Accordingly, the elastic member has an elastic performance for absorbing collision force, while having a sufficient rigidity itself.

For example, the room is a passenger compartment of a vehicle. In this case, the wall member is at least a dashboard of the vehicle, or at least a ceiling of the vehicle, or an under cover that covers at least an inside surface of the dashboard of the vehicle on a lower portion of the dashboard, or at least a door trim of the vehicle, or a pillar of the vehicle or the like. Alternatively, the room is a room of a building. In this case, the wall member is a ceiling of the building, or a side wall of the buiding, or a floor of the building or the like.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

The preferred embodiments of the present invention will be hereinafter described with reference to the accompanying drawings.

(First Embodiment)

The first embodiment of the present invention will be now described with reference to FIGS. 1–7. In the first embodiment, a wall member of the present invention is typically used for a dashboard 10 (instrument panel) of a vehicle.

Figure 1:
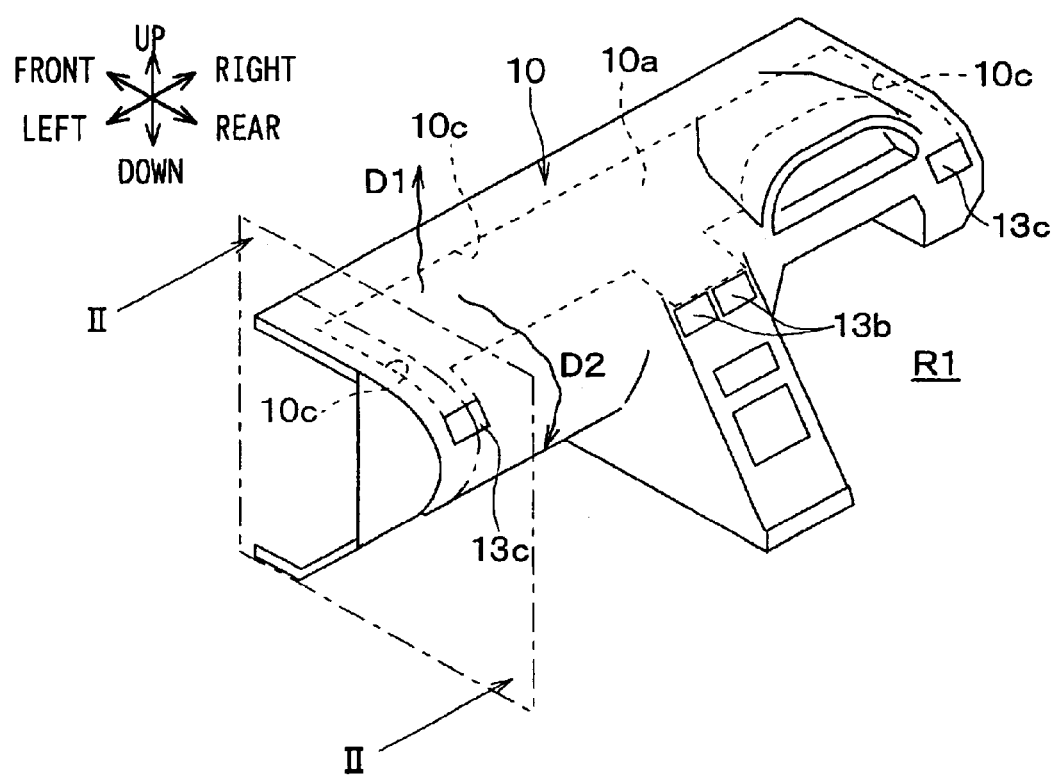
FIG. 1 is a perspective view when being viewed from a passenger compartment, showing a dashboard in which an air conditioner of an air conditioning system according to a first embodiment of the present invention is mounted.

The dashboard 10 shown in FIG. 1 is a design panel having a design surface 10a extending in a direction of width of a vehicle, and is arranged on the front side in a passenger compartment R1 near a front windshield glass. In the first embodiment, the dashboard 10 corresponds to a wall member of the present invention.

Figure 2:
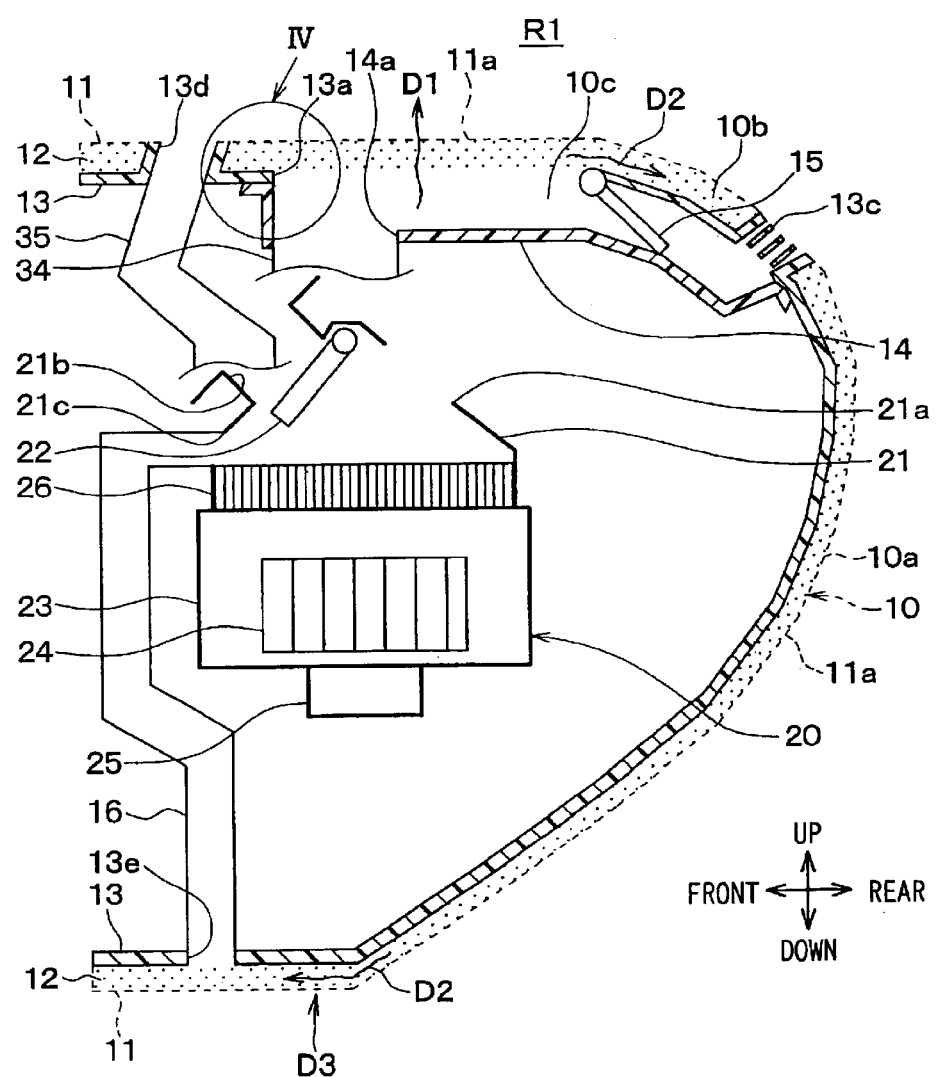
FIG. 2 is a cross-sectional view taken along the line II—II in FIG. 1, showing a blowing unit in the air conditioning system, according to the first embodiment.
Figure 3:
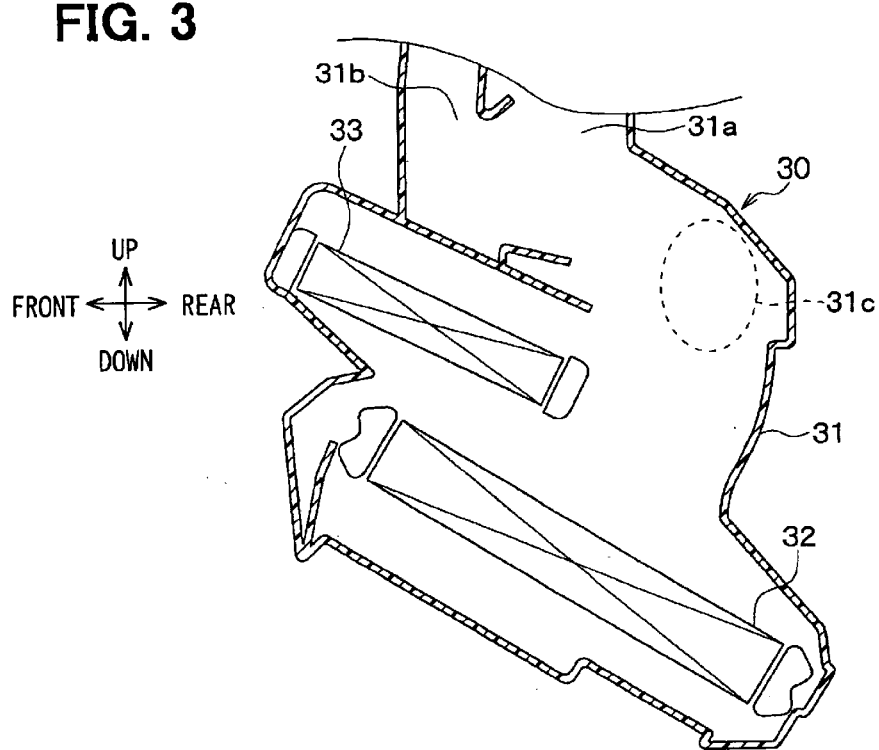
FIG. 3 is a cross-sectional view showing an air conditioning unit in the air conditioning system.

In an air conditioning system, an air conditioner mounted in the dashboard 10 is constructed of a blower unit 20 shown in FIG. 2 and an air conditioning unit 30 shown in FIG. 3. Then, the air conditioning unit 30 is disposed near the center in the direction of width of the vehicle in the dashboard 10 and, the blower unit 20 is disposed nearer to a front-passenger's seat than the air conditioner unit 30.

The blower unit 20 has an inside/outside air switching box 21 in which an inside air introducing opening 21a and an outside air introducing opening 21b are formed. Air (i.e., inside air) inside the passenger compartment R1 is introduced from the inside air introducing opening 21a, and air (i.e., outside air) outside the passenger compartment is introduced from the outside air introducing opening 21b. Then, both air introducing openings 21a and 21b are selectively opened and closed by an inside/outside air switching door 22 rotatably disposed on the inside/outside air switching box 21 to introduce the inside air or the outside air into the inside/outside air switching box 21. Further, the inside/outside air switching box 21 is provided with an inside air introducing opening 21c for the dashboard, that is always open irrespective of the position of the inside/outside air switching door 22. Still further, the blower unit 20 has a blower casing 23 communicating with the inside/outside air switching box 21. A fan 24 in the blower casing 23 is rotated by a motor 25 to blow the inside air or the outside air toward the air conditioning unit 30. A filter 26 for cleaning the air is disposed between the fan 24 and the inside/outside air switching door 22.

The air conditioning unit 30 has an air conditioning case 31 for defining an air passage. The air conditioning case 31 includes, an evaporator 32 as cooling means, a heater core 33 as heating means, an air mixing door as temperature controlling means, and an air outlet mode door as mode switching means for switching a flow direction of conditioned air blown from the air conditioning case 31 into the passenger compartment.

Further, a face opening 31a for blowing the conditioned air toward the upper body of a passenger and a defroster opening 31b for removing fogging produced on the front windshield glass are formed in the upper portion of the air conditioning case 31. A foot opening 31c for blowing the conditioned air toward at least the lower body of the passenger is formed in the lower portion of the air conditioning case 31. Then, as shown in FIG. 2, one end of a face duct 34 is connected to the face opening 31a and one end of a defroster duct 35 is connected to the defroster opening 31b.

Figure 4:
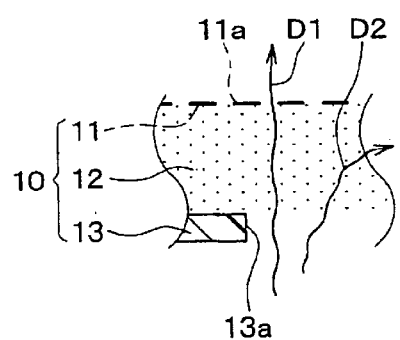
FIG. 4 is an enlarged view of a part of the air conditioning system shown by IV in FIG. 2.

Next, the structure of the dashboard 10, which is the main part of the present invention, will be described. FIG. 4 is an enlarged view of a part indicated by IV in FIG. 2. The dashboard 10 is constructed in a three-layer structure in which a surface skin 11, an elastic member 12 and a base plate 13 are laminated in this order from the inside of the passenger compartment R1. In the present embodiment, the whole dashboard 10 shown in FIG. 1 is constructed in the three-layer structure. However, a portion for forming a diffusion opening 13a, which will be described later, of the dashboard 10 is constructed in a two-layer structure in which the surface skin 11 and the elastic member 12 are laminated.

The surface skin 11 corresponds to a design sheet of the present invention. The surface skin 11 forms a design surface 10a and has a plurality of diffusion blowing openings 11a. The material of the surface skin 11 includes a fabric, a nonwoven fabric and a resin sheet. Here, in a case where the resin sheet is employed, a plurality of diffusion blowing openings 11a need to be formed in the resin sheet.

The base plate 13 is laminated on the opposite side of the passenger compartment R1 with respect to the surface skin 11 to form an inner air passage 10b between the base plate 13 and the surface skin 11. It is preferable to select a material capable of producing rigidity of the level that the dashboard 10 can keep its shape, for the material of the base plate 13. For example, resin is preferably used as the base plate 13. To be specific, as the material of the base plate 13, polypropylene, polyethylene, vinyl chloride, olefin base resin and the like can be used.

Figure 5:
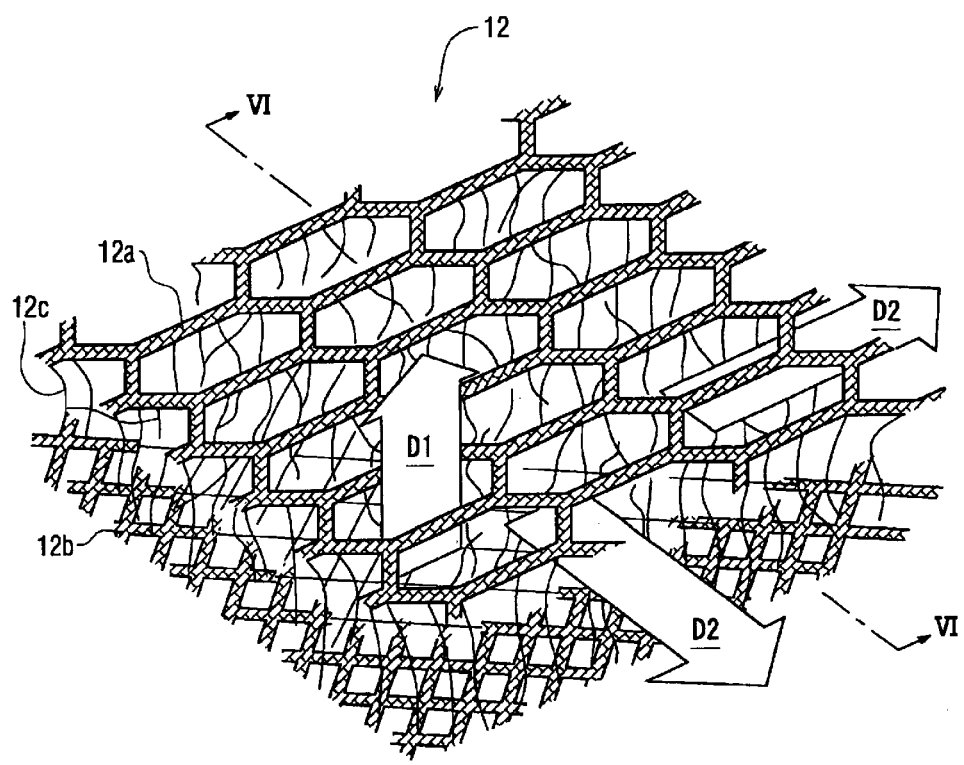
FIG. 5 is a perspective view showing an elastic member in FIG. 4.
Figure 6:
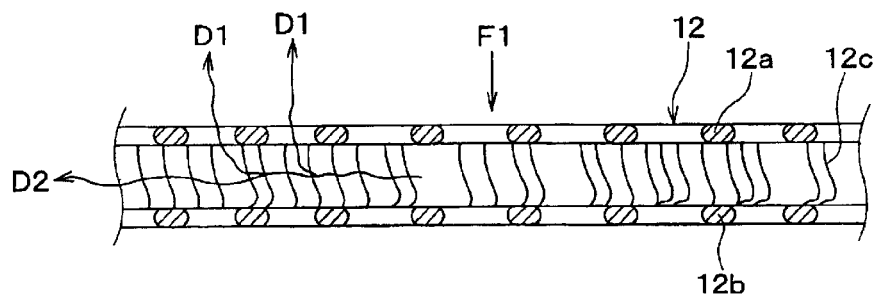
FIG. 6 is a cross-sectional view taken along the line VI—VI in FIG. 5, showing a structure of the elastic member.

The elastic member 12 is arranged in the inner air passage 10b and is sandwiched by the surface skin 11 and the base plate 13 to be elastically deformed. As the elastic member 12 is preferably used, for example, a three-dimensional sheet disclosed in Japanese Unexamined Patent Publication No. 2001-89959. FIG. 5 is a perspective view showing the elastic member 12 separately, and FIG. 6 is a cross sectional view taken on the line VI—VI in FIG. 5. The elastic member 12 of the present embodiment, as shown in FIG. 5 and FIG. 6, constructs a three-dimensional fabric in which a top textile 12a and a bottom textile 12b are arranged separately from each other and connected to each other by connecting threads 12c.

Nylon and other resins can be preferably used as the materials of the top textile 12a, the bottom textile 12b and the connecting threads 12c. Further, the top textile 12a and the bottom textile 12b are woven by threads to construct a woven cloth. The connecting threads 12c extending in the direction of thickness of the elastic member 12 are woven into the top textile 12a and the bottom textile 12b to construct the elastic member 12.

Since the elastic member 12 is constructed of the three-dimensional fabric, air can pass through the elastic member 12 in the direction of thickness as shown by the arrow D1, and can pass through also in the direction nearly vertical to the direction of thickness as shown by the arrow D2. Further, because the connecting threads 12c are constructed so as to extend in the direction of thickness as shown by an arrow F1 in FIG. 6, the connecting threads 12c can effectively generate a repulsive force to a load in the direction of thickness of the elastic member 12.

Figure 7:
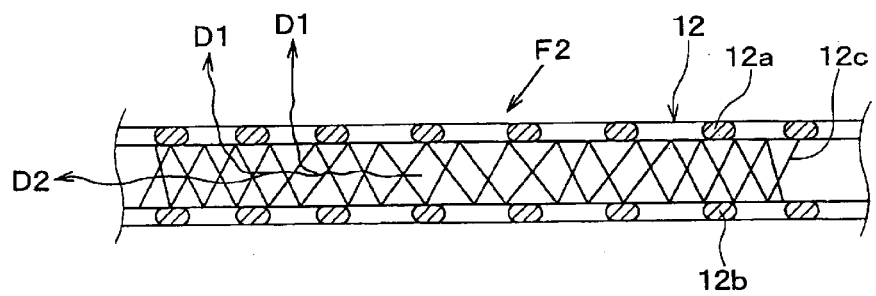
FIG. 7 is a sectional view corresponding to FIG. 6, showing another structure of the elastic member according to a modification of the first embodiment.

FIG. 7 is a modification of FIG. 6. In FIG. 7, the connecting threads 12c are constructed in the shape of a letter X so as to extend in a direction crossing the direction of thickness of the elastic member 12. According to this construction, as shown by an arrow F2, even if the load applied to the elastic member 12 in a slanting direction, the connection threads 12c can effectively generate the repulsive force.

Further, the diffusion opening 13a is formed in a portion near the front windshield glass in the base plate 13. The diffusion opening 13a is used also as an opening and an inflow opening for passing the conditioned air into the inner air passage 10b. Still further, in the base plate 13, there are provided with a center face blowing opening 13b and a side face blowing opening 13c, which are shown in FIG. 1, and a defroster blowing opening 13d and an outflow opening 13e, which are shown in FIG. 2.

A cover 14 for covering the diffusion opening 13a, the center face blowing opening 13b and the side face blowing opening 13c are provided on the side opposite to the elastic member 12 relative to the base plate 13. Then, the space defined by the elastic member 12 and the cover 14 is used as an outer air passage 10c for introducing the conditioned air into the inner air passage 10b. In FIG. 1, the outside shape of the outer air passage 10c is expressed by a dotted line.

A diffusion selector door 15 for opening or closing the center face blowing opening 13b and the side face blowing opening 13c is provided in a portion downstream from the diffusion opening 13a in an air flow.

One end of the defroster duct 35 is connected to the defroster opening 31b of the air conditioning case 31 and the other end of the defroster duct 35 is connected to the defroster blowing opening 13d. One end of the face duct 34 is connected to the face opening 31a of the air conditioning case 31, and the other end of the face duct 34 is connected to an opening 14a that is opened to the bottom surface of the cover 14. Further, the inside air introducing opening 21c of the inside/outside air switching box 21 is provided for the dashboard 10, and is connected to the outflow opening 13e of the base plate 13 by a circulation duct 16.

Further, the air conditioning system has an electronic control unit (not shown). Detecting signals from air-conditioning sensors and setting signals from a setting panel and the like are input to the electronic control unit. The air conditioning sensors detect information necessary for air conditioning control such as an inside air temperature, an outside air temperature and the amount of solar radiation. A temperature setting value is set and inputted to the setting panel by the operation of the passenger. The electronic control unit calculates a well-known target air temperature TAO based on these input signals and the set value, and controls air conditioning components such as servo motors and electromagnetic clutches for driving the inside/outside air switching door 22, an air mixing door, the air-outlet mode switching door and the diffusion selector door 15.

In the present embodiment, by controlling an opening degree of the diffusion selector door 15, any one of a face mode, a diffusion mode and a face/diffusion mode can be selected. When the diffusion selector door 15 is set at the position shown by the solid line in FIG. 2, the diffusion mode is set in which the conditioned air is diffused and blown off from the diffusion blowing openings 11a of the dashboard 10 into the passenger compartment R1 through the diffusion opening 13a, as shown by the arrow D1. In the diffusion mode, as shown by the arrow D2, the conditioned air flows in the inner air passage 10b extending nearly in parallel to the design surface 10a. In other words, the conditioned air flows in the inner air passage 10b extending in the direction nearly vertical to the direction of thickness of the dashboard 10.

A part of the conditioned air flowing in the inner air passage 10b is blown off from the diffusion blowing openings 11a into the passenger compartment R1 and the other part of the conditioned air flows toward the outflow opening 13e of the base plate 13. Then, the conditioned air flowing out of the outflow opening 13e passes through the circulation duct 16 and flows from the inside air introducing opening 21c of the inside/outside air switching box 21 into the inside/outside air switching box 21. That is, a part of the air sent from the blower unit 20 is circulated through the air conditioning unit 30, the face duct 34, the dashboard 10, and the circulation duct 16. The inside air in the passenger compartment RI, as shown by an arrow D3 in FIG. 2, is sucked into the diffusion blowing openings 11a provided near the outflow opening 13e.

When the diffusion selector door 15 is fully opened, the face mode is set, so that the conditioned air (cool air) is blown off from the center face blowing opening 13b and the side face blowing opening 13c into the passenger compartment R1. Since the resistance of the air blown off from the diffusion blowing openings 11a is very large, the conditioned air is blown off mainly from the face blowing openings 13b and 13c and a small amount of conditioned air is blown off also from the diffusion blowing openings 11a. When the diffusion selector door 15 is opened by a middle opening, the face/diffusion mode is set, so that the conditioned air is blown off from both of the face blowing openings 13b, 13c and the diffusion blowing openings 11a.

An air speed is higher in the face mode than in the diffusion mode. Therefore, some occupant feels uncomfortable, depending on his preferences, when he receives the conditioned air at high air speed. For example, the passenger feels comfortable at the initial stage of a cool-down operation in which a cooling operation is performed at a maximum cooling capacity and a maximum blowing capacity. However, after a while he sometimes feels the high-speed conditioned air to be uncomfortable. In this case, the diffusion mode can be preferably set.

Then, the electronic control unit determines an air outlet mode based on the target air temperature TAO and operates various kinds of doors such as the diffusion selector door 15 and the like so as to realize the determined air outlet mode.

According to the first embodiment, in a case where the cooling operation is performed by the air conditioner (e.g., the blower unit 20 and the air conditioning unit 30) in the diffusion mode or in the face/diffusion mode, the cool air is blown off from the diffusion blowing openings 11a of the design surface 10a. Thus, it is possible to cool the dashboard 10 by the cool air while cooling the passenger compartment R1. Further, since the cool air flows in the inner air passage 10b extending in the direction nearly vertical to the direction of thickness of the dashboard 10, the dashboard 10 can be more effectively cooled by the cool air. Thus, this can reduce the radiant heat from the dashboard 10 and hence can immediately cool the inside of the passenger compartment R1.

The dashboard 10 is provided with the elastic member 12 in the present embodiment. Therefore, even when the passenger collides with the dashboard 10 when the vehicle collides with something, the impact can be absorbed by the elastic member 12. Thus, the elastic member 12 can protect the passenger and improve safety. Moreover, when the passenger touches the dashboard 10 by hand, the passenger can feels a touch of high quality by means of the elastic member 12.

In the first embodiment, the space defined by the elastic member 12 and the cover 14 is used as the outer air passage 10c for passing the conditioned air. Therefore, the outer air passage 10c can be effectively provided in the dashboard 10, and the thickness dimension of the dashboard 10 can be reduced by the thickness of the base plate 13.

In the first embodiment, the base plate 13 has the diffusion opening 13a for flowing the cool air into the inner air passage 10b and the outflow opening 13e for flowing off the cool air from the inner air passage 10b. Thus, it can facilitate the flow of the cool air passing through the inner air passage 10b. Moreover, as shown in FIG. 1, the diffusion opening 13a is formed in the top surface of the dashboard 10 and the outflow opening 13e is formed in the bottom surface of the dashboard 10, so that the cool air flows from the top end of the inner air passage 10b to the bottom end thereof. Thus, this can facilitate the flow of the cool air passing through the whole inner air passage 10b.

In the first embodiment, the outflow opening 13e provided in the base plate 13 is made to communicate with the inside air introducing opening 21c of the blower unit 20 by the circulation duct 16. Therefore, the cool air flowing through the inner air passage 10b is circulated through the blower unit 20, the air conditioning unit 30 and the inner air passage 10b within the dashboard 10. Thus, the flow of the cool air passing through the inner air passage 10b can be facilitated.

(Second Embodiment)

The second embodiment of the present invention will be now described with reference to FIG. 8. In the first embodiment described above, the diffusion blowing openings 11a are provided in the whole area of the surface skin 11 of the dashboard 10. In the second embodiment, however, the diffusion blowing openings 11a are closed in a lower portion of the surface skin 11, opposite to the lower body of the passenger, among the dashboard 10.

Figure 8:
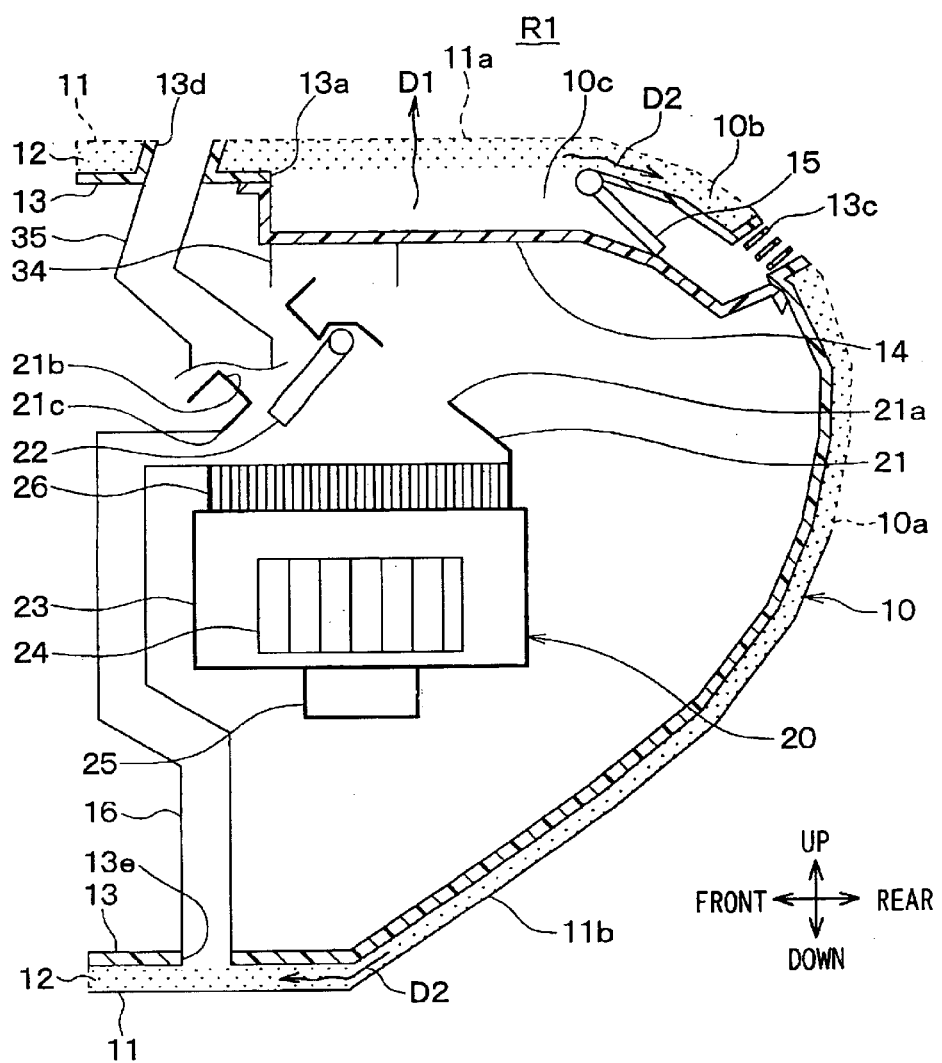
FIG. 8 is a cross-sectional view showing an air conditioning system according to a second embodiment of the present invention.

FIG. 8 shows an air conditioning system of the second embodiment and corresponds to FIG. 2 of the first embodiment. In the second embodiment, a material incapable of passing the air is employed as the lower portion of the surface skin 11 opposite to the lower body of the passenger, of the dashboard 10. A resin sheet can be preferably employed as the lower portion of the surface skin 11, opposite to the lower body of the passenger.

According to the second embodiment, it is possible to prevent the cool air from being blown off toward the lower body of the passenger. Therefore, it can prevent air conditioning feeling of the passenger from being deteriorated. In the second embodiment, the other parts are similar to those of the above-described first embodiment.

(Third Embodiment)

The third embodiment of the present invention will be now described with reference to FIG. 9.

In the above-described first and second embodiments, the elastic member 12 is used for the whole surface of the dashboard 10. In the third embodiment, however, the elastic member 12 is employed only for a portion corresponding to the diffusion opening 13a of the dashboard 10 and this portion is constructed in a two-layer structure of the surface skin 11 and the elastic member 12. Here, the other portion of the diffusion opening 13a of the dashboard 10 is constructed of only the base plate 13.

In this respect, the above-described two-layer structure can be realized by applying a member of a material and a structure providing rigidity to the elastic member 12 of the present embodiment. As one example of such the elastic member 12, the member having the material and structure, shown in FIG. 5, which has been described in the first embodiment, can be used.

Moreover, the cover 14 in the above-described first and second embodiments covers the diffusion opening 13a, the center face blowing opening 13b and the side face blowing opening 13c. However, in the third embodiment, the cover 14 forming the outer air passage 10c covers only the diffusion opening 13a.

The diffusion selector door 15 of the above-described first and second embodiments is provided in a portion downstream from the diffusion opening 13a of the outer air passage 10c in the air flow direction. However, in the third embodiment, the diffusion selector door 15 is provided in a portion upstream from the diffusion opening 13a in the air flow direction.

Figure 9:
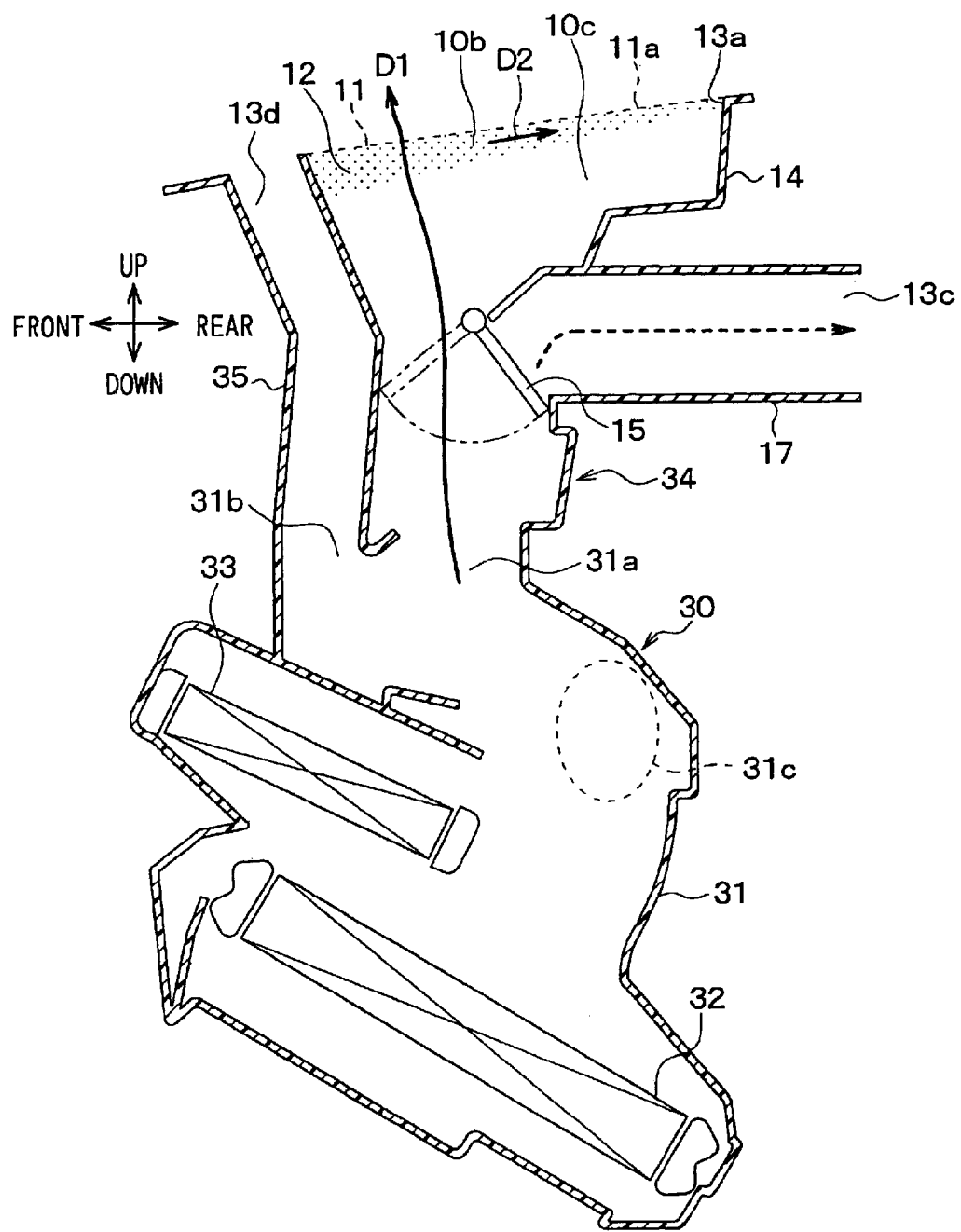
FIG. 9 is a cross-sectional view showing an air conditioning system according to a third embodiment of the present invention.

According to the third embodiment, in the portion having the two-layer structure of the dashboard 10, as shown by the arrow D1 in FIG. 9, the cool air is blown off from the diffusion blowing openings 11a. Further, as shown by the arrow D2 in FIG. 2, the cool air flows in the inner air passage 10b extending in the direction nearly vertical to the direction of thickness of the dashboard 10. Thus, the passenger compartment R1 can be immediately cooled.

In the third embodiment, as shown in FIG. 9, the thickness of the elastic member 12 is increased nearer to the position of the main stream of the cool air to adjust the air flow such that the air blows nearly uniformly from the plurality of air outlet openings 11a of the dashboard 10.

(Fourth Embodiment)

The fourth embodiment of the present invention will be now described with reference to FIGS. 10–15

In the above-described first to third embodiments, as the wall member of the present invention, the dashboard 10 is used. However, as the wall member, at least one of a pillar and a ceiling of the vehicle can be used. In the fourth embodiment, the present invention is typically applied to the pillar and the ceiling.

Figure 10:
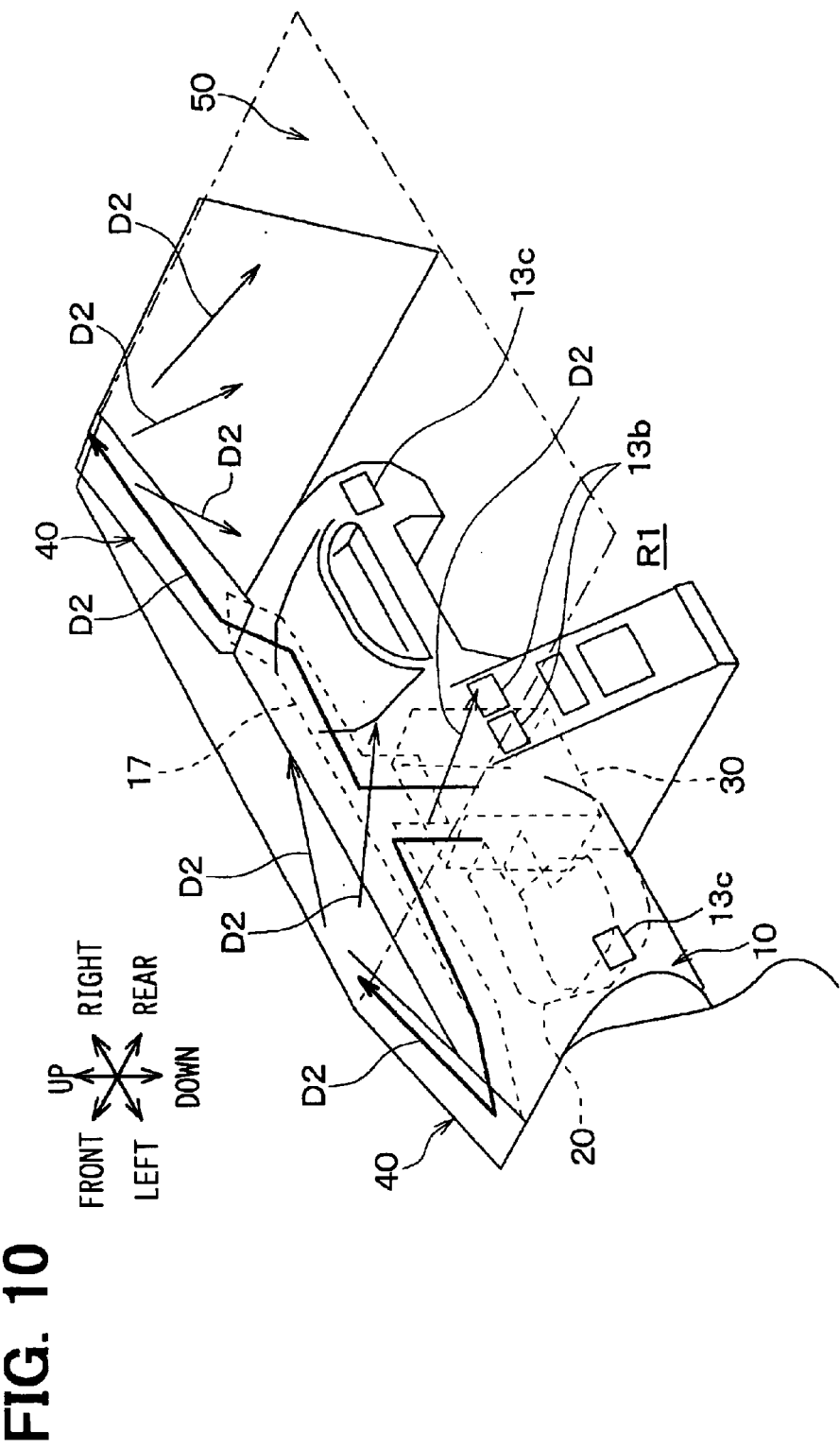
FIG. 10 is a perspective view showing a dashboard, a pillar and a ceiling, with an air conditioning system according to a fourth embodiment.
Figure 11:
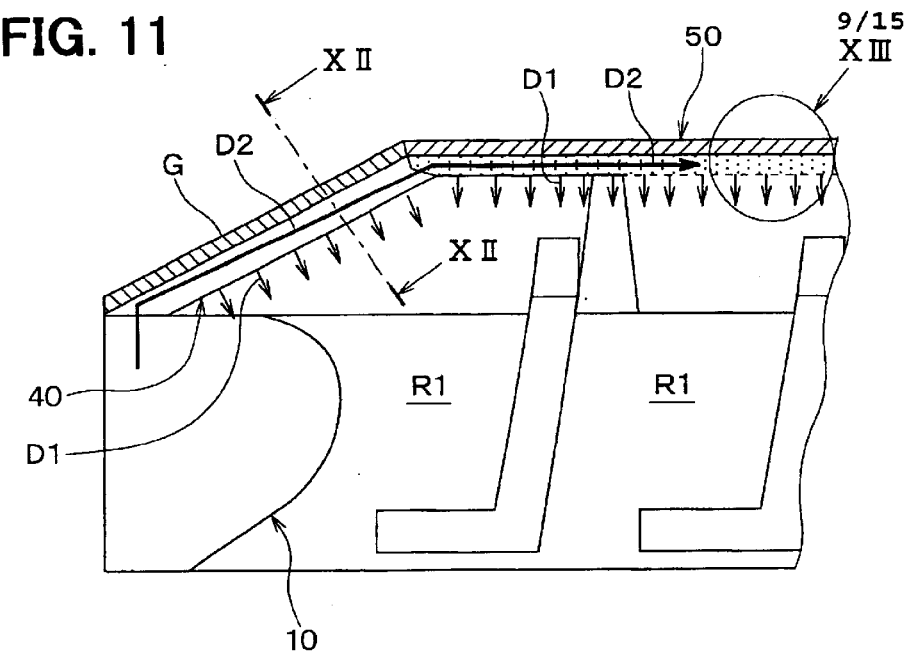
FIG. 11 is a schematic sectional view showing the air conditioning system in FIG. 10.
Figure 12:
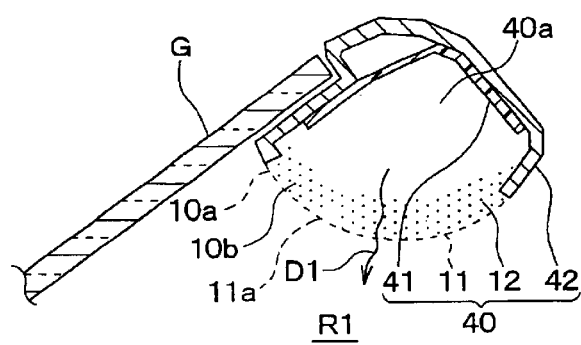
FIG. 12 is a cross-sectional view taken along the line XII—XII in FIG. 11.
Figure 13:
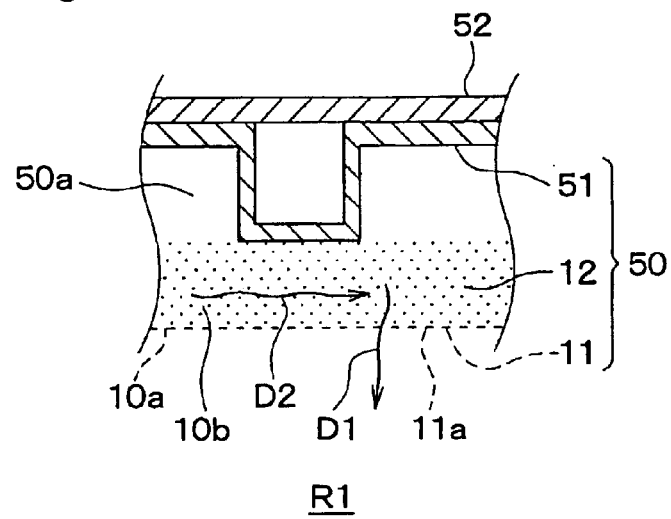
FIG. 13 is an enlarged view of a portion indicated by XIII in FIG. 11.

FIG. 10 is a perspective view showing the dashboard 10 mounted with the air conditioner (i.e., the blower unit 20 and air conditioning unit 30), an A pillar 40 and a ceiling 50. FIG. 11 is a schematic sectional view showing the air conditioning system of FIG. 10. FIG. 12 is a cross-sectional view taken along the line XII–XII in FIG. 11 and FIG. 13 is an enlarged view of a portion XIII in FIG. 11. As shown in FIG. 12, the A pillar 40 is formed by laminating the surface skin 11, the elastic member 12, a base plate 41 and a pillar body 42 in this order from the inside of the passenger compartment R1. The materials and structures of the surface skin 11, the elastic member 12 and the base plate 41 are the same as those of the surface skin 11, the elastic member 12 and the base plate 13 in the first embodiment. Further, the pillar body 42 is a member made of metal and functioning as a reinforcing member. In the fourth embodiment, a space 40a is provided between the elastic member 12 and the base plate 41 thereby to reduce the flow resistance of the cool air when the cool air flows in the A pillar 40.

As shown in FIG. 13, the ceiling 50 is formed by laminating the surface skin 11, the elastic member 12, a reinforcing member 51 as a base plate and a ceiling body 52 in this order from the inside of the passenger compartment R1. The materials and structures of the surface skin 11 and the elastic member 12 are the same as in the first embodiment, and the reinforcing member 51 and the ceiling body 52 are members made of metal and functioning as a reinforcing member, respectively. In the fourth embodiment, a space 50a is provided between the elastic member 12 and the reinforcing member 51 thereby to reduce the flow resistance of the cool air when the cool air flows in the ceiling 50.

As shown in FIGS. 10 and 11, the cool air from the face opening 31a of the air conditioning unit 30 flows through a duct 17 into the bottom end of the A pillar 40. And, as shown by the arrows D2, the cool air flows through the space 40a of the A pillar 40 and the inner air passage 10b. Simultaneously, as shown by arrows D1, the cool air is blown off from the diffusion blowing openings 11a of the A pillar 40 into the passenger compartment R1. Then, the cool air flowing into the ceiling 50, as shown by the arrows D2, flows in the space 50a of the ceiling 50 and the inner air passage 10b and at the same time, as shown by the arrow D1, is blown off from the diffusion blowing openings 11a into the passenger compartment R1 from the diffusion blowing openings 11a of the ceiling 50.

In this manner, the cool air is blown from the diffusion blowing openings 11a of the A pillar 40 and the ceiling 50. Thus, it is possible to cool the A pillar 40 and the ceiling 50 by the cool air while cooling the passenger compartment R1. Since the cool air flows in the inner air passage 10b extending nearly parallel to the design surface 10a, the A pillar 40 and the ceiling 50 can be more effectively cooled by the cool air. Therefore, the radiant heat from the A pillar 40 and the ceiling 50 can be reduced and hence the passenger compartment R1 can be immediately cooled.

Further, the A pillar 40 and the ceiling 50 are provided with the elastic member 12 in the present embodiment. Therefore, even in a case where the passenger collides with the A pillar 40 and the ceiling 50 when the vehicle collides with something, the impact can be absorbed by the elastic member 12. Thus, the elastic member 12 can protect the passenger and enhance safety. Moreover, when the passenger touches the A pillar 40 and the ceiling 50 by hand, the passenger can feel a touch of high quality by means of the elastic member 12.

Still further, because the cool air is blown off from the diffusion blowing openings 11a provided in the whole portion of the A pillar 40 and the ceiling 50, it is possible to cool the passenger compartment R1 without giving an air-flowing feeling to the passenger. In addition, since the cool air flows down from the ceiling 50 by natural convention, it is possible to further prevent the air-flow feeling from being given to the passenger.

Figure 14:
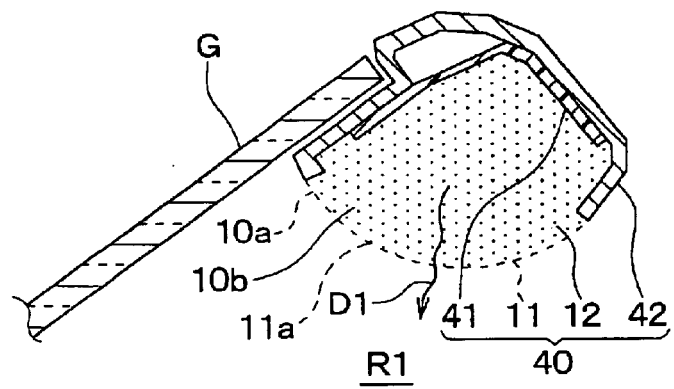
FIG. 14 is a cross-sectional view corresponding to FIG. 12, according to a modification of the fourth embodiment.
Figure 15:
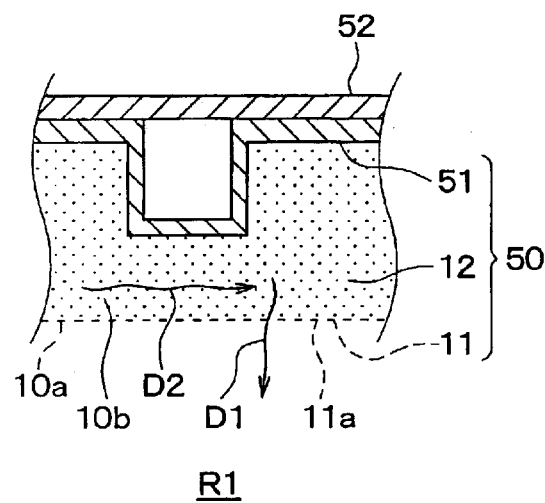
FIG. 15 is an enlarged view corresponding to FIG. 13, according to the modification of the fourth embodiment.

In the fourth embodiment of the present invention, the above-described spaces 40a and 50a can be omitted as shown in FIG. 14 and FIG. 15.

(Fifth Embodiment)

Figure 16:
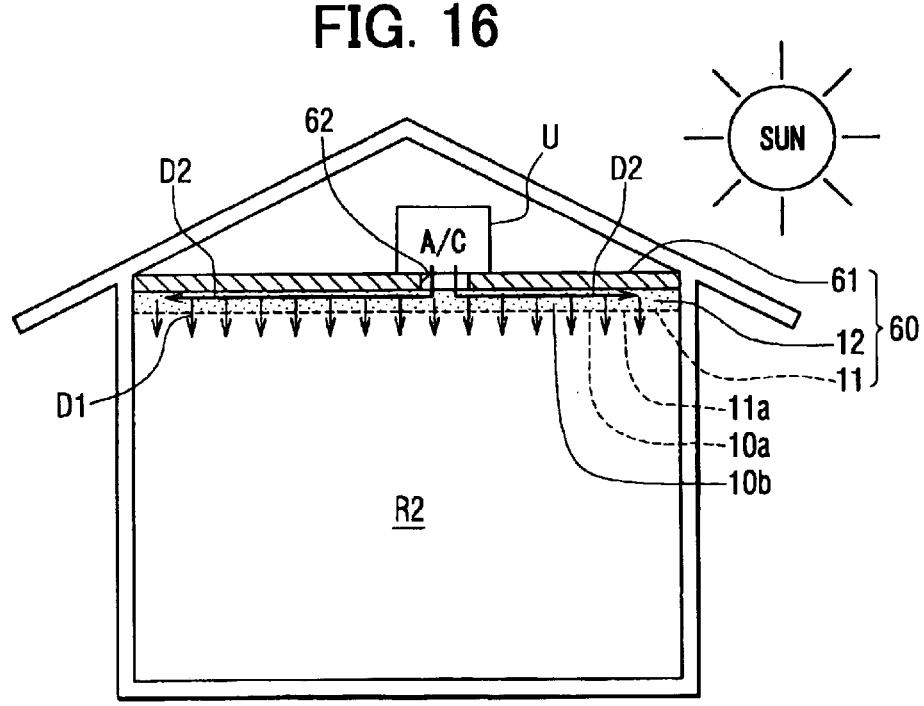
FIG. 16 is a schematic diagram showing an air conditioning system according to a fifth embodiment of the present invention.

The fifth embodiment of the present invention will be now described with reference to FIG. 16. In the fifth embodiment, the air conditioning system of the present invention is used for air-conditioning a room of a building. FIG. 16 is a schematic diagram showing an air conditioning system in accordance with the fifth embodiment, in which the wall member of the present invention is applied to a ceiling 60 of the building.

The ceiling 60 is formed by laminating the surface skin 11, the elastic member 12 and a ceiling body 61 in this order from the inside of a room R2. The materials and structures of the surface skin 11 and the elastic member 12 are the same as those in the above-described first embodiment. The ceiling body 61 is a reinforcing member.

In the fifth embodiment, a cooling unit U having at least a cooling capacity is arranged on the reverse side of the ceiling 50. Then, the cool air blown from the cooling unit U is introduced into the inner air passage 10b from an opening 62 formed in the ceiling body 61. Therefore, air from the opening 62 flows through the inner air passage 10b of the ceiling 60 as shown by the arrow D2 in FIG. 16, and is blown into the inside of the room R2 from the diffusion blowing openings 11a of the ceiling 60, as shown by the arrow D1 in FIG. 16.

Because the cool air is blown off from the diffusion blowing openings 11a of the ceiling 60 in the fifth embodiment, it is possible to cool the ceiling 60 by the cool air while cooling the inside of the room R2. In addition, because the cool air passes through the inner air passage 10b extending nearly parallel to the design surface 10a, it is possible to further cool the ceiling 60 by the cool air. Thus, it is possible to reduce the radiant heat from the ceiling 60 and hence to immediately cool the inside of the room R2. In particular, the ceiling 60 of the building becomes high temperature under the blazing sun. In this case, it is possible to effectively cool the ceiling 60.

Further, because the cool air is blown off from the diffusion blowing openings 11a formed in the whole area of the ceiling 60, it is possible to cool the inside of the room R2 without giving an air-flow feeling to a person in the room. Still further, because the cool air flows down by the natural convention, it is possible to further prevent the air-flow feeling from being given to the person in the room.

(Sixth Embodiment)

Figure 17:
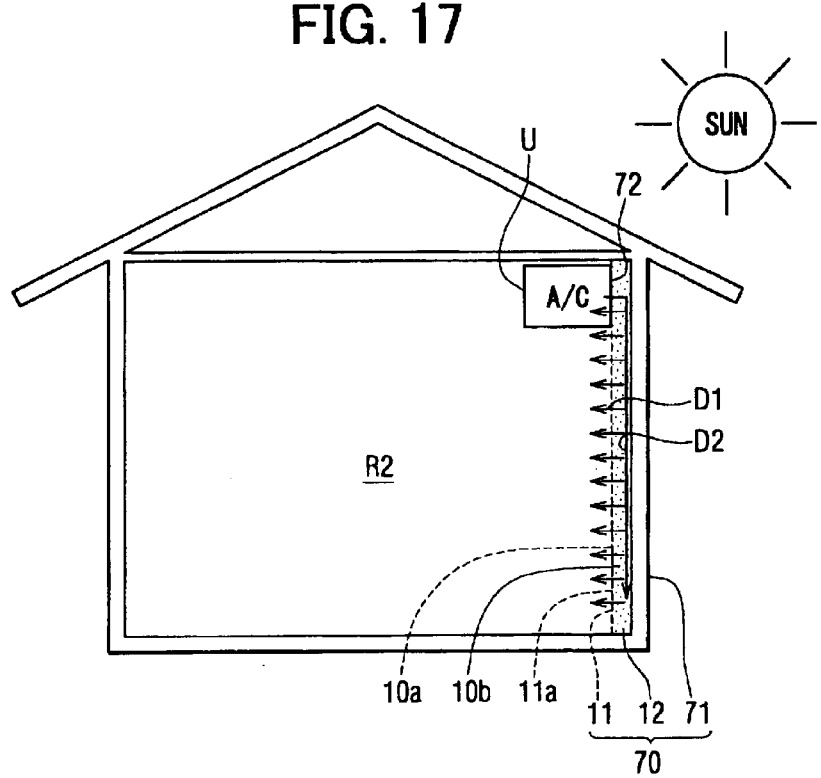
FIG. 17 is a schematic diagram showing an air conditioning system according to a sixth embodiment of the present invention.

The sixth embodiment of the present invention will be now described with reference to FIG. 17. FIG. 17 is a schematic diagram showing an air conditioning system in accordance with the sixth embodiment. In the sixth embodiment, the wall member of the present invention is a wall 70 of a building.

The wall 70 is formed by laminating the surface skin 11, the elastic member 12 and a wall body 71 in this order from the inside of the room R2. The materials and structures of the surface skin 11 and the elastic member 12 are the same as those in the first embodiment, and the wall body 71 is a member functioning as a reinforcing member. Moreover, the cooling unit U is arranged in the room R2.

Then, the cool air blown from the cooling unit U is introduced from an opening formed in the surface skin 11 into the inner air passage 10b of the wall 70, and flows through the inner air passage 10b of the wall 70 as shown by the arrow D2. Further, the cool air introduced into the inner air passage 10b of the wall 70 is blown from the diffusion blowing openings 11a of the wall 70 as shown by the arrows D1 while passing through the inner air passage 10b of the wall 70.

The cool air is blown from the diffusion blowing openings 11a in this manner, so that it is possible to cool the wall 70 by the cool air while cooling the room R2. Further, because the cool air passes through the inner air passage 10b extending nearly parallel to the design surface 10a, it is possible to more effectively cool the wall 70 by the cool air. Thus, it is possible to reduce radiant heat from the wall 70 and hence to immediately cool the room R2. The wall 70 of the building becomes high temperature under the blazing sun. In this case, it is possible to effectively cool the wall 70 by the use of the present invention. Further, if the wall 70 is arranged at a place receiving the solar radiation, it is possible to more effectively enhance the cooling effect. Still further, because the cool air is blown from the diffusion blowing openings 11a formed in the whole wall 70, it is possible to cool the inside of the room R2 without giving an air-flow feeling to a person in the room.

Moreover, because the wall 70 has the elastic member 12 in the present embodiment, even if a human body hits the wall 70, it is not damaged. In addition, when a person touches the wall 70 by hand, he can get a feeling of high quality by the elastic member 12.

(Seventh Embodiment)

Figure 18:
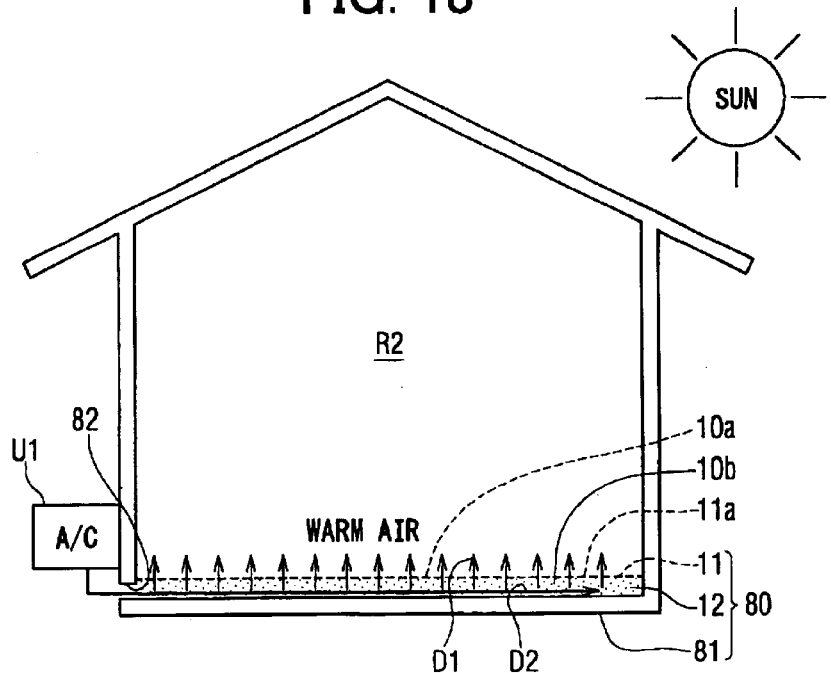
FIG. 18 is a schematic diagram showing an air conditioning system according to a seventh embodiment of the present invention.

The seventh embodiment of the present invention will be now described with reference to FIG. 18. FIG. 18 is a schematic diagram showing an air conditioning system in accordance with the seventh embodiment. In the seventh embodiment, the wall member of the present invention is a floor 80 of a building.

The floor 80 is formed by laminating the surface skin 11, the elastic member 12 and a floor body 81 in this order from the inside of the room R2. The materials and structures of the surface skin 11 and the elastic member 12 are the same as those in the first embodiment, and the floor body 81 is used as a reinforcing member.

Moreover, a reference symbol U1 shown in FIG. 18 denotes a heating unit having at least a heating function, and the heating unit U1 is arranged outside the room R2.

Then, the warm air blown from the heating unit U1 is introduced into the inner air passage 10b of the floor 80 from an opening 82 formed in the surface skin 11. Warm air introduced into the inner air passage 10b of the floor 80 flows through the inner air passage as shown by the arrow D2, and then is blown from the diffusion blowing openings 11a of the floor 80 into the room R2 as shown by the arrows D1.

The warm air is blown from the diffusion blowing openings 11a of the floor 80 in this manner, so that it is possible to heat the floor 80 by the warm air while heating the room R2. Further, because the warm air passes through the inner air passage 10b extending nearly parallel to the design surface 10a, it is possible to more effectively heat the floor 80 by the warm air. Thus, it is possible to reduce heat absorbed by the floor 80 and hence to immediately heat the room R2. Further, because the warm air is blown from the diffusion blowing openings 11a formed in the whole floor 80, it is possible to heat the room R2 without giving an air-flow feeling to a person in the room R2. Still further, because the warm air flows up from the floor 80 by natural convention, it is possible to further prevent the air-flow feeling from being given to the person in the room.

Moreover, because the floor 80 has the elastic member 12 in the present embodiment, it can provide a good cushioning ability to a human body and hence is excellent in safety. In addition, when a person touches the floor 80 by hand, the person can get a feeling of high quality by the elastic member 12.

(Eighth Embodiment)

The eighth embodiment of the present invention will be now described with reference to FIGS. 19 and 20. The wall member of the present invention is the dashboard 10 in the above-described first to third embodiments, and is to at least one of the pillar and the ceiling of the vehicle in the fourth embodiment. However, in the eighth embodiment, the wall member of the present invention includes both of the dashboard 10 and a ceiling 50.

Figure 19:
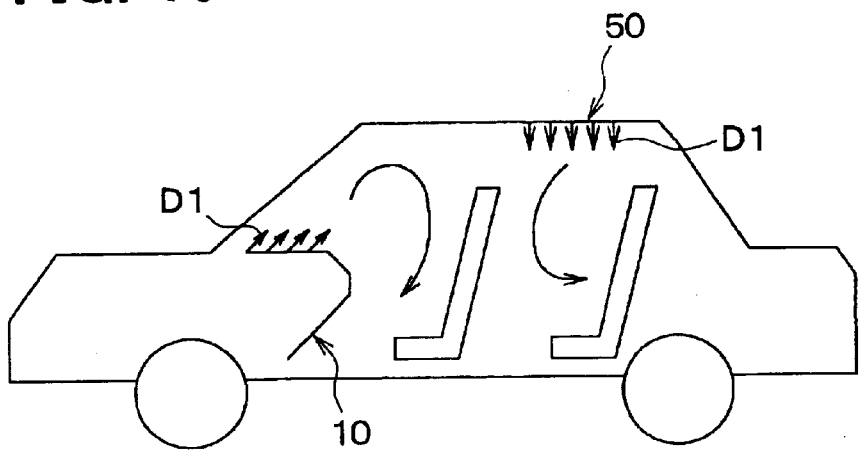
FIG. 19 is a schematic diagram showing an air conditioning system according to an eighth embodiment of the present invention.
Figure 20:
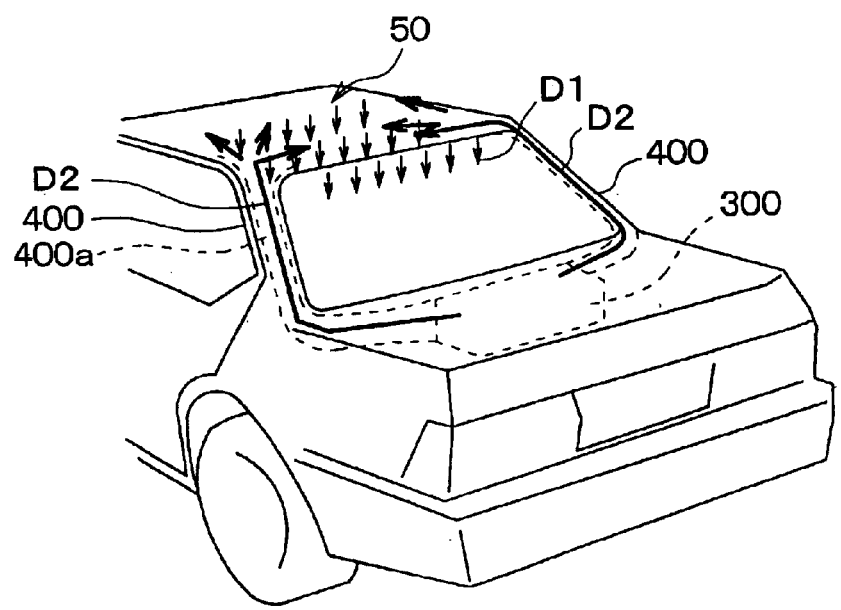
FIG. 20 is a perspective view showing the air conditioning system according to the eighth embodiment.

As shown in FIG. 19 and FIG. 20, in the eighth embodiment, in addition to the front air conditioner (20 and 30) in the first embodiment, a rear air conditioner 300 having a blowing opening provided in a rear seat air conditioning zone is mounted in the passenger compartment. Then, the conditioned air is sent from the rear air conditioner 300 through the inside of a C pillar 400 to a plurality of diffusion blowing openings 11a formed in the ceiling 50. The C pillar 400 is a pillar located at each of left and right sides of a rear windshield, and has the same structure as the above-described A pillar 40. Therefore, conditioned air flows in the C pillar 400, similarly to the above-described A pillar 40.

In a case where the wall member is only the dashboard 10 and the cool air is blown from the diffusion blowing openings 11a of the dashboard, the cool air hardly reaches the passenger in the rear seat of the vehicle. This causes the passenger in the rear seat to suffer deficient air coolness. In contrast, according to the eighth embodiment, as the wall member, both of the dashboard 10 and the ceiling 50 of the vehicle are used. This permits the passenger in the rear seat to enjoy sufficient air coolness.

Incidentally, the front air conditioner (20 and 30) and the rear air conditioner 300 can be controlled independently from each other. Therefore, the front seat and the rear seat can be independently air-conditioned by independent temperature control. This permits both occupants in the front and rear seats to enjoy a good air conditioning feeling even in a case where either the front seat or the rear seat receives the solar radiation one-sidedly.

Further, the larger the total area of the diffusion blowing openings 11a formed in the ceiling 50 is, the slower the initial blowing speed of the conditioned air blown from the diffusion blowing openings 11a becomes. Meanwhile, as the area of the region where the diffusion blowing openings 11a of the design wall surface 10a constructing the inside surface of the ceiling 50 are formed becomes larger and the gap between the neighboring diffusion blowing openings 11a becomes larger, the variation of the above-described initial speed can e restricted. However, in this case, the speed of the conditioned air when it reaches the passenger becomes smaller.

Thus, when the area of the region where the diffusion blowing openings 11a are formed expands, the amount of the conditioned air blown into the room can be surely kept, and the flow speed of the air conditioner can be reduced. This can prevent the passenger from suffering uncomfortable feeling due to high speed conditioned air. However, the slower the speed of the conditioned air hitting the passenger becomes, the more difficult to keep a good air conditioning feeling is. To cope with this, the temperature of the conditioned air needs to be lowered. This brings about the increase of the cooling load of the rear air conditioner 300. Inversely, when the flow speed of the conditioned air hitting the passenger is made higher, uncomfortable feeling is given to the passenger.

Thus, in view of the disadvantageously increased cooling load of the rear air conditioner 300 and the effect of preventing the passenger from suffering uncomfortable feeling due to the high speed conditioned air, it is preferable that the area of the region where the diffusion blowing openings 11a of the design wall surface of the ceiling 50 is in a range between 0.1 $m^2$ and 2.0 $m^2$, most preferably, in a range between 0.5 $m^2$ and 1.2 $m^2$.

As the initial flow speed of the conditioned air blown from the diffusion blowing openings 11a becomes smaller, the effect for preventing the passenger from suffering uncomfortable feeling due to high-speed conditioned air can be improved. The present inventors have found from their test that if the initial flow speed becomes slower than a limit speed, the air conditioning felt by the passenger becomes worse. Therefore, it is preferable that the initial flow speed of the conditioned air blown from the diffusion blowing openings 11a is in a range between 0.1 m/s and 0.5 m/s.

In the ninth embodiment, as shown in FIG. 19, the diffusion blowing openings 11a are formed on the upper portion of the dashboard. Therefore, it can prevent the cool air from being blown toward the lower body of a passenger from the diffusion blowing openings 11a.

(Ninth Embodiment)

Figure 21:
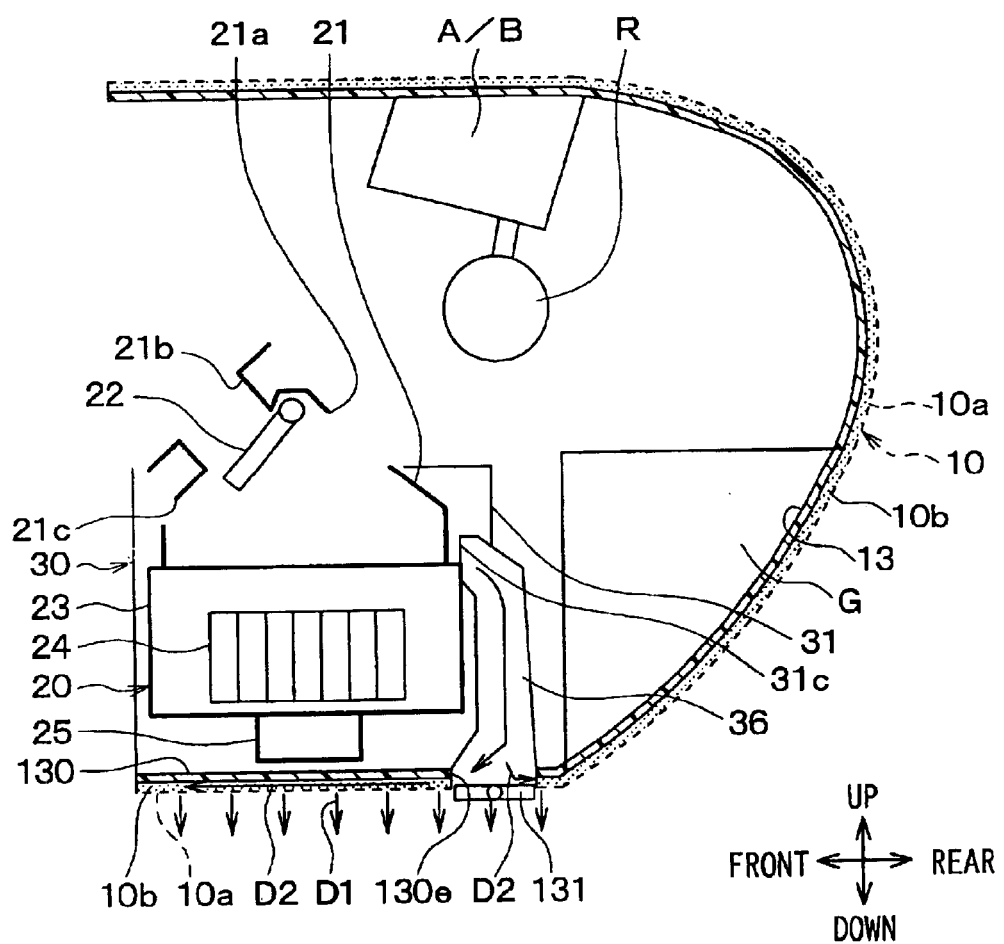
FIG. 21 is a schematic diagram showing an air conditioning system according to a ninth embodiment of the present invention.

The ninth embodiment of the present invention will be now described with reference to FIG. 21. In the ninth embodiment, as shown in FIG. 21, the wall member of the present invention an under cover 130 that covers the inside of the dashboard 10 on the bottom side to hide the dashboard 10. In this case, the warm air is blown from the diffusion blowing openings 11a toward the feet of the passenger. Therefore, it possible to perform a heating operation without heating the face portion of the passenger.

The under cover 130 has the same structure as the dashboard 10. The under cover 30 has not only the diffusion blowing openings 11a but also a spot blowing opening 130e through which the conditioned air is blown toward the local portion in the passenger compartment. The spot blowing opening 130e is provided with a plate door 131 as door means for selectively opening and closing the diffusion blowing openings 11a and the spot blowing opening 130e.

In this regard, a reference symbol G in FIG. 21 denotes a glove box, a reference symbol R denotes a support member having a function of supporting at least a steering wheel, and a reference symbol A/B denotes an air bag unit.

(Tenth Embodiment)

Figure 22:
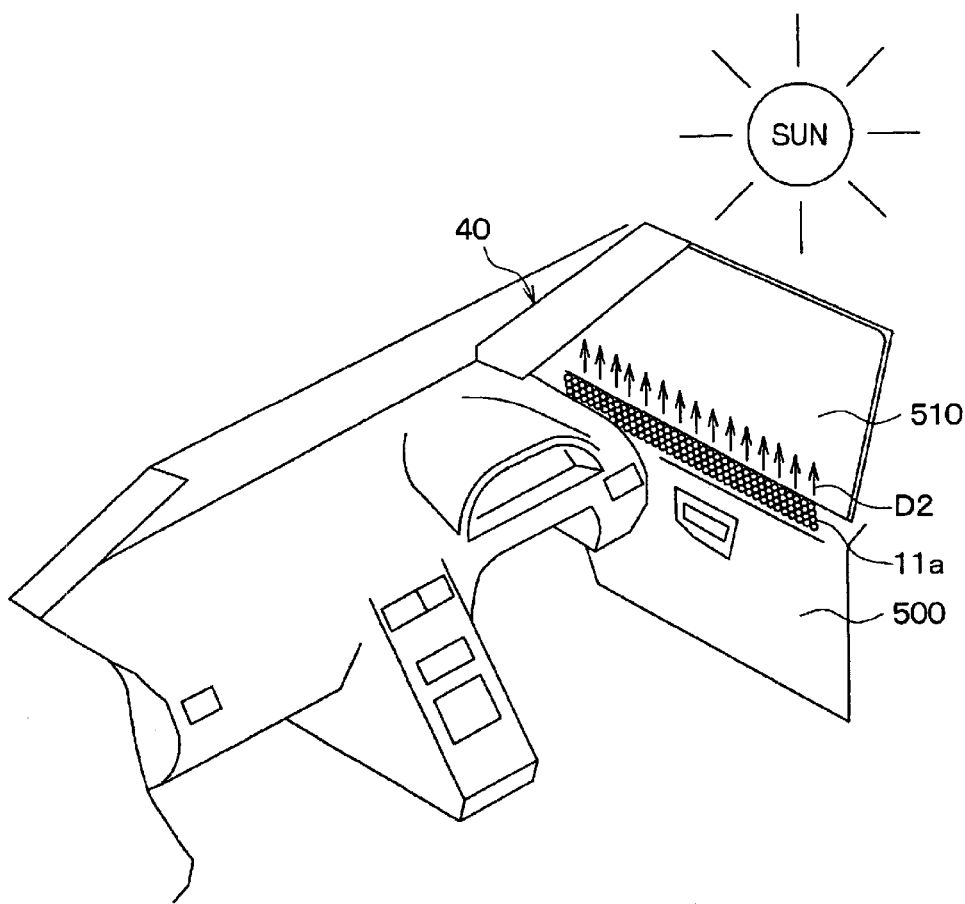
FIG. 22 is a schematic diagram showing an air conditioning system according to a tenth embodiment of the present invention.

The tenth embodiment of the present invention will be now described with reference to FIG. 22. FIG. 22 is a perspective view showing an air conditioning system in accordance with the tenth embodiment. In the tenth embodiment, a door trim 500 is used as the wall member of the present invention. In a top portion of the door trim 500, a plurality of diffusion blowing openings 11a are formed, so that the conditioned air is blown toward a side windshield 510 from the diffusion blowing openings 11a.

This construction can properly handle the below two cases in a following manner. In a case where the conditioned air is cool air, the side windshield 510 and its peripheral members such as the door trim 500 and a pillar 40 can be cooled by the cool air, thus preventing the side windshield 510 and its peripheral members 40 and 500 from being heated to be high in temperature by the solar radiation and the outside air. Therefore, it can prevent the heat from the side windshield and its peripheral members from radiating inside the passenger compartment. On the other hand, in a case where the conditioned air is warm air, the side windshield 510 and its peripheral members such as the door trim 500 and the pillar 40 can be heated by the warm air, thereby preventing the side windshield 510 and its peripheral members 40 and 500 from being cooled to be low in temperature by outside cool air. Therefore, it can prevent the side windshield and its peripheral members from absorbing heat from the air in the passenger compartment According to the tenth embodiment, the conditioned air from the air conditioning unit 30 mounted in the dashboard 10 is introduced into the door trim 500.

(Other Embodiments)

Although the present invention has been fully described in connection with the preferred embodiments thereof with reference to the accompanying drawings, it is to be noted that various changes and modifications will become apparent to those skilled in the art.

For example, as the wall members 10, 40–80 in the first to seventh embodiments, the elastic member 12 is provided. However, the elastic member 12 may be omitted in the wall members 10, 40–80 of the first to seventh embodiments.

Moreover, in the above-described first to sixth embodiments, the present invention is applied to a case where the cool air is blown from the wall member. However, the present invention can be also applied to a case where the warm air is blown from the dashboard 10, the A pillar 40, the ceiling 50 of the vehicles and the ceiling 60 and the wall 70 of the building to heat the compartment of the vehicle or the room of the building.

Such changes and modifications are to be understood as being within the scope of the present invention as defined by the appended claims.

What is claimed is:

1. An air conditioning system comprising:
   an air conditioner for blowing conditioned air into a room; and
   a wall member having
      a design sheet having a design wall surface exposed inside the room and having a plurality of diffusion blowing openings,
      a base plate arranged on a side opposite to the room from the design sheet, the design sheet and the base plate defining an inner air passage extending along a surface of the wall member, the inner air passage and the diffusion blowing openings supplying the conditioned air from the air conditioner to the room, and
      an elastic member arranged in the inner air passage between the design sheet and the base plate, wherein the elastic member is made of a porous elastic material and pores of the elastic member facilitate flow of the conditioned air through the inner air passage in a direction parallel to the surface of the wall member to condition the wall member.

2. The air conditioning system according to claim 1, wherein the elastic member has a resin thread extending in a direction of thickness of the elastic member.

3. The air conditioning system according to claim 1, wherein the elastic member has a resin thread extending in a direction crossing a direction of thickness of the elastic member.

4. The air conditioning system according to claim 1, wherein the design sheet is made of a cloth.

5. The air conditioning system according to claim 1, wherein the base plate further has an outflow opening through which the conditioned air flows out of the inner air passage.

6. The air conditioning system according to claim 5, wherein the diffusion opening is provided in one end portion of the base plate and the outflow opening is provided in the other end portion of the base plate.

7. The air conditioning system according to claim 5, wherein:
   the air conditioner includes a blower unit including a blower for blowing air, and an air conditioning unit for adjusting an air temperature; and
   the outflow opening provided in the base plate communicates with an air suction port of the blower.

8. The air conditioning system according to claim 1, wherein the room is a passenger compartment of a vehicle.

9. The air conditioning system according to claim 8, wherein the wall member includes at least a dashboard of the vehicle.

10. The air conditioning system according to claim 8, wherein the conditioned air is cool air cooled by the air conditioner.

11. The air conditioning system according to claim 10, wherein the diffusion blowing openings are provided in a top surface portion of the dashboard.

12. The air conditioning system according to claim 10, wherein the diffusion blowing openings are closed at a lower portion of the dashboard.

13. The air conditioning system according to claim 12, wherein the wall member is at least a ceiling of the vehicle.

14. The air conditioning system according to claim 13, wherein:
the air conditioner includes a front air conditioning unit having a front blowing opening through which conditioned air is blown toward a front seat air-conditioning zone of the passenger compartment, and a rear air conditioning unit having a rear blowing opening through which conditioned air is blown toward a rear seat air-conditioning zone of the passenger compartment of the vehicle; and
the conditioned air from the rear air conditioning unit is introduced to the diffusion blowing openings provided in the ceiling.

15. The air conditioning system according to claim 14, wherein an area of a region where the diffusion blowing openings provided in the design wall surface is in a range between 0.1 m$^2$ and 2.0 m$^2$.

16. The air conditioning system according to claim 14, wherein an initial flow speed of the conditioned air blown from the diffusion blowing openings is in a range between 0.1 m/s and 0.5 m/s.

17. The air conditioning system according to claim 12, wherein:
the conditioned air is a warm air heated by the air conditioner; and
the wall member is an under cover that covers at least an inside surface of a dashboard of the vehicle on a lower portion of the dashboard.

18. The air conditioning system according to claim 17, wherein the under cover has the diffusion blowing openings and a spot blowing opening for blowing the conditioned air toward a local portion in the passenger compartment,
the air conditioning system further comprising
door means for selectively opening and closing the diffusion blowing openings and the spot blowing opening.

19. The air conditioning system according to claim 12, wherein the wall member is at least a door trim of the vehicle, and the diffusion blowing openings are provided in the door trim such that the conditioned air is blown from the diffusion blowing openings toward a side windshield.

20. The air conditioning system according to claim 1, wherein the room is a room of a building.

21. The air conditioning system according to claim 20, wherein the conditioned air is a cool air cooled by the air conditioner.

22. The air conditioning system according to claim 21, wherein the wall member is arranged at a portion receiving solar radiation in the room.

23. The air conditioning system according to claim 20, wherein the wall member is a ceiling of the building.

24. The air conditioning system according to claim 20, wherein the wall member is a floor of the building.

25. The air conditioning system according to claim 1, wherein:
the room is a passenger compartment of a vehicle and the wall member includes at least a vehicle dashboard having a face opening from which conditioned air is blown toward an upper side of the passenger compartment;
the air conditioning system further comprising
a diffusion selector door disposed in the outer air passage for selectively opening and closing the face opening.

26. The air conditioning system according to claim 25, wherein the diffusion selector door is disposed to set one of a face mode where the face opening is fully opened, a face/diffusion mode where the face opening is partially opened, and a diffusion mode where the face opening is fully closed.

27. The air conditioning system according to claim 25, wherein:
in the face mode, the conditioned air is mainly blown from the face opening into the passenger compartment;
in the face/diffusion mode, the conditioned air is blown from both the diffusion blowing openings and the face opening into the passenger compartment; and
in the diffusion mode, the conditioned air is blown from the diffusion blowing openings into the passenger compartment.

28. The air conditioning system according to claim 1, wherein:
the base plate has a diffusion opening opened in a portion from which the conditioned air is introduced and diffused to the inner air passage; and
the elastic member is exposed from the base plate at the diffusion opening,
the air conditioning system further comprising
a cover covering the diffusion opening, wherein:
the cover is disposed to form a clearance between the cover and the elastic member at the diffusion opening; and
the cover has a cover opening for introducing the conditioned air from the air conditioner into the diffusion opening through the clearance.

29. The air conditioning system according to claim 1, wherein:
the elastic member extends along the design sheet and is provided to contact the design sheet and the base plate; and
the base plate extends along the inner air passage.

30. A wall member for facilitating flow of conditioned air from an air conditioner to a room, comprising:
a design sheet having a design wall surface exposed to the room and having a plurality of diffusion blowing openings;
a base plate, arranged on a side opposite the room from the design sheet, the design sheet and the base plate defining an inner air passage extending along a surface of the wall member, the inner air passage and the plurality of diffusion blowing openings supplying the conditioned air from the air conditioning system to the room; and
an elastic member arranged in the inner air passage between the design sheet and the base plate, wherein the elastic member is made of a porous elastic material and pores of the elastic member facilitate flow of the conditioned air through the inner air passage in a direction parallel to the surface of the wall member to condition the wall member.

31. An air conditioning system comprising:
an air conditioner for blowing conditioned air into a room; and
a wall member having a design wall surface exposed inside the room wherein:

the wall member has therein an inner air passage through which the conditioned air introduced from the air conditioner flows, and the inner air passage extends approximately parallel to the design wall surface;

the design wall surface has a plurality of diffusion blowing openings communicating with the inner air passage; and the inner air passage and the diffusion blowing openings are provided such that the conditioned air is blown from the diffusion blowing openings into the room while passing through the inner air passage in a direction parallel to the surface of the wall member to condition the wall member.

* * * * *